(12) United States Patent
Komori et al.

(10) Patent No.: US 7,867,596 B2
(45) Date of Patent: *Jan. 11, 2011

(54) WET FRICTION MEMBER

(75) Inventors: Kentaro Komori, Saitama (JP); Satoshi Yoshida, Saitama (JP); Atsushi Takahashi, Saitama (JP); Toshihiko Kaneiwa, Aichi (JP)

(73) Assignees: Honda Motor Co., Ltd., Tokyo (JP); Asahi Organic Chemicals Industry Co., Ltd., Miyazaki (JP)

( * ) Notice: Subject to any disclaimer, the term of this patent is extended or adjusted under 35 U.S.C. 154(b) by 251 days.

This patent is subject to a terminal disclaimer.

(21) Appl. No.: 11/791,279

(22) PCT Filed: Nov. 2, 2005

(86) PCT No.: PCT/JP2005/020176
§ 371 (c)(1),
(2), (4) Date: May 22, 2007

(87) PCT Pub. No.: WO2006/057142
PCT Pub. Date: Jun. 1, 2006

(65) Prior Publication Data
US 2007/0298211 A1 Dec. 27, 2007

(30) Foreign Application Priority Data
Nov. 24, 2004 (JP) ............................. 2004-338328

(51) Int. Cl.
*B32B 17/12* (2006.01)
*F16D 69/02* (2006.01)

(52) U.S. Cl. ................................. 428/66.2; 192/107 M

(58) Field of Classification Search ................. 428/66.2, 428/408, 293.4; 192/107 M
See application file for complete search history.

(56) References Cited

U.S. PATENT DOCUMENTS

| 4,291,794 A | * | 9/1981 | Bauer ..................... 192/107 M |
| 5,045,356 A | * | 9/1991 | Uemura et al. ........... 427/249.2 |
| 7,476,439 B2 | * | 1/2009 | Komori et al. ........... 428/293.4 |
| 2003/0041524 A1 | | 3/2003 | Gardner |
| 2004/0164438 A1 | | 8/2004 | Lamport |

FOREIGN PATENT DOCUMENTS

| DE | 103 06 587 A1 | 9/2003 |
| EP | 0 645 552 A1 | 3/1995 |
| JP | 08-104761 A | 4/1996 |
| JP | 11-005850 A | 1/1999 |
| JP | 2003-240032 | 8/2003 |
| JP | 2003-240033 | 8/2003 |
| WO | WO 97/22815 | 6/1997 |
| WO | WO 00/35669 | 6/2000 |

\* cited by examiner

*Primary Examiner*—Alexander Thomas
(74) *Attorney, Agent, or Firm*—Arent Fox LLP

(57) ABSTRACT

A carbon fiber composite material (10) is provided which includes carbon fibers (11), a matrix (12) binding the carbon fibers (11) together, and pores (13), and a volume fraction of the carbon fibers (11) exclusive of the pores (13) is not less than 45% and up to 80%. The carbon fiber composite material (10) may preferably have a porous structure of which a porosity is not more than 20% and up to 70%. This carbon fiber composite material (10) has a high static friction coefficient ($\mu S$), and low $\mu$ ratio, and thus is suitable for a wet friction member (e.g., carbon disc 5) which is excellent in both of static friction performance and dynamic friction performance.

6 Claims, 5 Drawing Sheets

WET FRICTION MEMBER

CROSS-REFERENCE TO RELATED APPLICATION

This application is a National Stage entry of International Application No. PCT/JP2005/020176, filed Nov. 2, 2005, the entire specification claims and drawings of which are incorporated herewith by reference.

TECHNICAL FIELD

This invention relates to a carbon fiber composite material, a process for manufacturing the same, and a wet friction member, and more particularly to a wet friction member for use in a wet clutch for an automatic transmission of an automotive vehicle, a carbon fiber composite material for use in the wet friction member, and a process for manufacturing the same.

BACKGROUND ART

Generally speaking, wet friction members having high porosities are preferred for improving a dynamic friction performance of a wet clutch. Those achieving high static friction performances are also preferred for improving a torque capacity of a clutch system.

Materials for wet friction members containing carbon fibers, which are called carbon fiber composite materials, are known in the art (e.g., see JP 11-5850 A). Such carbon fiber composite materials may be manufactured with a dry process or an impregnation process. In the dry process, a mixture of carbon fibers and resin powder is prepared at the outset. Subsequently, the mixture is molded and then subjected to heat. At this time, the resin powder melts and solidifies to bind the carbon fibers together, while becoming carbonized into a matrix, whereby a carbon fiber composite material is obtained. In the impregnation process, on the other hand, a carbon fiber woven or nonwoven fabric is impregnated with a resin solution. Subsequently, the carbon fiber woven fabric or the like is dried and then subjected to heat. Accordingly, the resin contained in the carbon fiber woven fabric or the like becomes carbonized into a matrix, whereby a carbon fiber composite material is obtained.

In order to improve both of the dynamic friction performance and the static friction performance in a wet friction member comprising a carbon fiber composite material, the proportion of the carbon fibers therein should be increased and the porosity thereof should be increased. In other words, the wet friction member should have a porous structure with a larger volume of carbon fibers bound together by a smaller quantity of matrix.

However, the manufacture of a wet friction member through the dry process or impregnation process as previously employed would require an excessive amount of resin to be used for the carbon fibers, because the carbon fibers are rigid and less flexible, hardly tangled together, and of low bending stiffness. As a result, a volume fraction of carbon fibers (exclusive of pores) in the wet friction member would be low.

Moreover, another disadvantage in a wet friction member obtained through the conventional dry or impregnation process is that distribution of carbon fibers, matrix and pores would become uneven. As a result, the conventional dry or impregnation process could not produce a wet friction member having a large volume of carbon fibers and a high porosity. Accordingly, the conventional dry or impregnation process could not remove difficulties in manufacturing a wet friction member achieving excellence in both of the static friction performance and the dynamic friction performance.

With this in view, it would be desirable to provide a wet friction member achieving excellence in both of the static friction performance and the dynamic friction performance, a carbon fiber composite material from which such a wet friction member is made, and a process for manufacturing the same.

DISCLOSURE OF INVENTION

In one aspect of the present invention, there is provided a carbon fiber composite material comprising: carbon fibers; a matrix binding the carbon fibers together; and pores, wherein a volume fraction of the carbon fibers exclusive of the pores is not less than 45 percent and up to 80 percent.

The carbon fiber composite material contains carbon fibers of which the volume fraction (exclusive of the pores) is not less than 45 percent. That is, a wet friction member made up of the above carbon fiber composite material has an increased volume fraction of the carbon fibers in comparison with other wet friction members made up of any of the conventional carbon fiber composite materials. Accordingly, the wet friction member is more excellent in the static friction performance in comparison with the other wet friction members made up of any conventional carbon fiber composite material.

The carbon fiber composite material according to the present invention also contains a matrix binding the carbon fibers together. This carbon fiber composite material is united and bridged with the matrix, with the result that the volume fraction of the carbon fibers (exclusive of the pores) exhibits a high value ranging from not less than 45 percent up to 80 percent inclusive. That is, the carbon fibers are bound together by a smaller quantity of the matrix in comparison with a conventional implementation with the wet friction member (carbon fiber composite material). As a result, the wet friction member (carbon fiber composite material) according to the present invention contains an increased number of the pores distributed uniformly in comparison with the conventional wet friction member (carbon fiber composite material). That is, the wet friction member (carbon fiber composite material) according to the present invention has a higher porosity in comparison with the conventional wet friction member (carbon fiber composite material). Accordingly, the wet friction member (carbon fiber composite material) according to the present invention is more excellent in the dynamic friction performance in comparison with the conventional wet friction members (carbon fiber composite material).

The above-described carbon fiber composite material may contain carbon fibers of which a volume fraction is preferably not less than 50 percent, or more preferably not less than 55 percent.

In the above-described carbon fiber composite material, a porosity thereof may preferably be not less than 20 percent and up to 70 percent, in order to achieve excellence in the dynamic friction performance.

A process for manufacturing a carbon fiber composite material, in another aspect of the present invention, comprises: a wet preparation step which comprises uniformly dispersing carbon fibers and resin particles in a liquid, flocculating the carbon fibers and the resin particles while keeping a uniform state thereof, and removing the liquid to obtain a solid content with the resin particles adhered uniformly to the carbon fibers; a forming step which comprises pressurizing and heating the solid content including the carbon fibers and the resin particles obtained through the wet preparation step; and a baking step which comprises baking the solid content formed through the forming step.

According to this process for manufacturing a carbon fiber composite material, the wet preparation step causes the carbon fibers and the resin particles to be mixed uniformly in the liquid, and serves to obtain a solid content with the resin particles adhered uniformly to the carbon fibers. Subsequently, the forming step causes the carbon fibers contained in the solid content to be bound together with the resin. The resin contained in the solid content formed in this way is carbonized through the baking step. Thus, the process for manufacturing a carbon fiber composite material according to the present invention can cause the resin particles, which will be a matrix, to be adhered uniformly to the carbon fibers; therefore, the carbon fibers can be bound together efficiently with a minimum amount of the resin used therefor. As a result, this manufacturing process can increase the volume fraction of the carbon fibers (exclusive of the pores) in the carbon fiber composite material.

Furthermore, in this process for manufacturing a carbon fiber composite material, the carbon fibers are bound together by a matrix dispersed uniformly within the carbon fiber composite material, and thus uniformly distributed pores are formed in the carbon fiber composite material.

According to the present invention, a wet friction member achieving excellence in both of the static friction performance and the dynamic friction performance, a carbon fiber composite material from which such a wet friction member is made, and a process for manufacturing the same can be provided.

The above-described aspects and advantages, other advantages and further features of the present invention will become more apparent by describing in detail illustrative, non-limiting embodiments thereof below with reference to the accompanying drawings.

BRIEF DESCRIPTION OF DRAWINGS

[FIG. 2]

[FIG. 3]

BEST MODE(S) FOR CARRYING OUT THE INVENTION

Next, exemplary embodiments of the present invention will be described in detail with reference made to the drawings where deemed appropriate.

Figure 1:
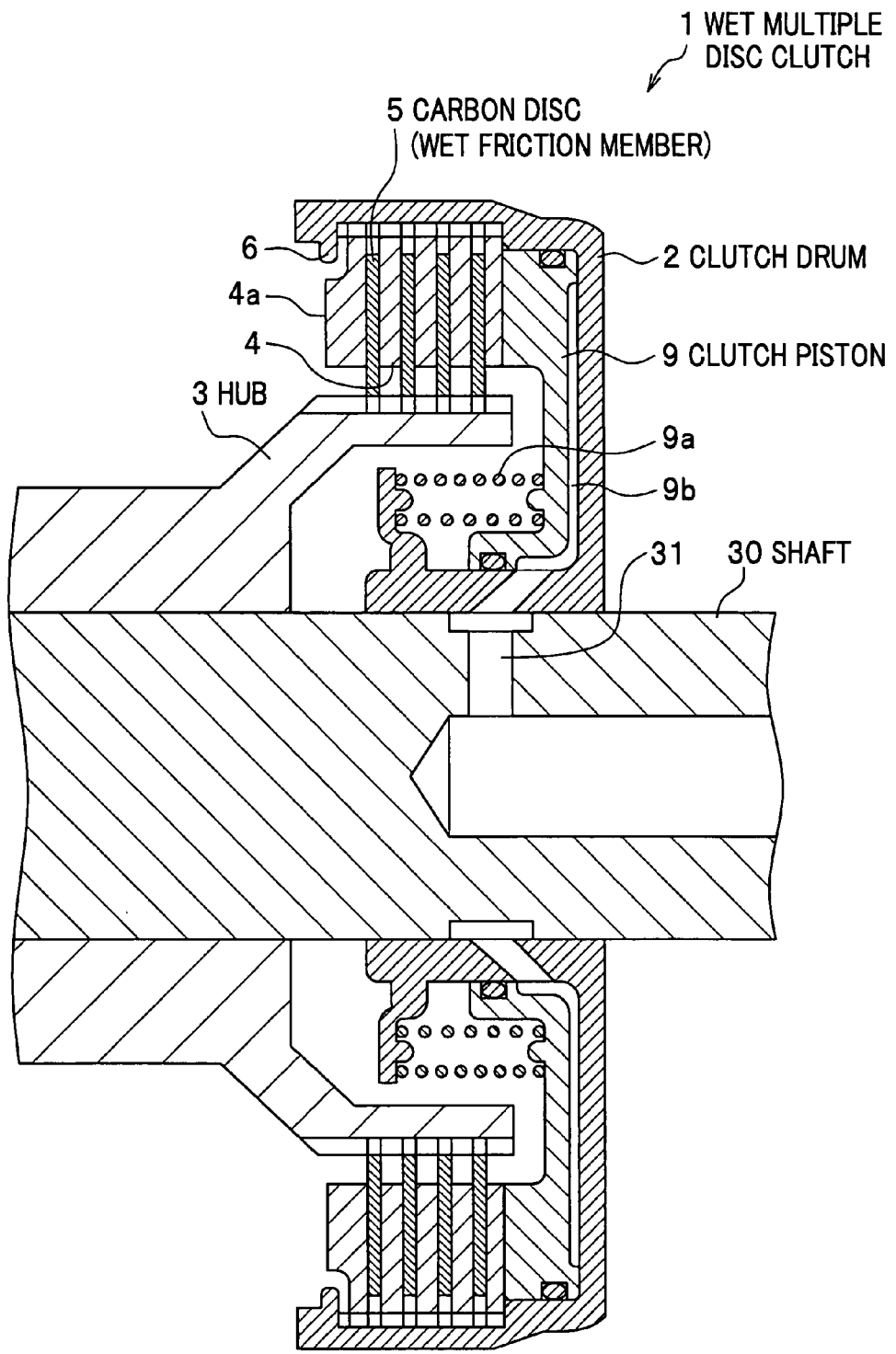
[FIG. 1] Shown herein is a sectional view of a wet multiple disc clutch incorporating a wet friction member (carbon disc) according to an exemplary embodiment.

Prior to describing the wet friction member according to the present embodiment, first, a wet multiple disc clutch which incorporates the wet friction member will be brought up for discussion. As shown in FIG. 1, a wet multiple disc clutch 1 is of a structure known in the art, and includes a shaft 30 in which a channel 31 for a hydraulic fluid is formed, a substantially tubular clutch drum 2, a substantially tubular hub 3 fitted in the clutch drum 2, a discal clutch piston 9 fitted in the clutch drum 2 in which a hydraulic chamber 9b communicating with the channel 31 for the hydraulic fluid is formed between the clutch piston 9 and the clutch drum 2, a plurality of annular separator plates 4 (made of SPCC (steel sheet)) arranged along a central axis of the clutch drum 2, and annular carbon discs 5 fitted on the hub 3 and arranged alternately with the separator plates 4. Carbon disc 5 corresponds to "wet friction member" as set forth in the appended claims.

The clutch drum 2 is mounted integrally with the shaft 30 so that the clutch drum 2 rotates together with the shaft 30. The hub 3 is fitted on the shaft 30 so that the hub 3 rotates about the shaft 30 independently of the shaft 30. The clutch piston 9 is configured slidably along the central axis of the clutch drum 2, and the clutch piston 9 is pressed toward the hydraulic chamber 9b by means of a spring 9a.

As is well known in the art, each of the separator plates 4 has teeth (external gear teeth) that are formed on an outer cylindrical surface thereof and fit into a splined inner cylindrical surface of the clutch drum 2 slidably in a direction parallel to the central axis of the clutch drum 2. Each of the carbon discs 5 has teeth (internal gear teeth) that are formed on an inner cylindrical surface thereof and fit into a splined outer cylindrical surface of the hub 3 slidably in the direction parallel to the central axis of the clutch drum 2.

The inner cylindrical surface of the clutch drum 2 has a stopper portion 6 formed therein for causing the separator plates 4 and the carbon discs 5 to stop sliding. Further provided on the inner cylindrical surface of the clutch drum 2 is an annular retaining plate 4a (made of SPCC (steel sheet)) disposed between the stopper portion 6 and the carbon disc 5. The retaining plate 4a has teeth (external gear teeth) that are formed on an outer cylindrical surface thereof and fit into the splined inner cylindrical surface of the clutch drum 2 slidably in the direction parallel to the central axis of the clutch drum 2.

The wet multiple disc clutch 1 as described above is a device configured either to transmit a torque of the shaft 30 to the hub 3 or to transmit a torque of the hub 3 to the shaft 30, in accordance with a mode of application thereof or a mounted position thereof. The following description illustrates with an instance where the torque of the shaft 30 is transmitted to the hub 3. As the shaft 30 rotates and thus causes the clutch drum 2 to rotate about the central axis, the separator plates 4 and the retaining plate 4a which fit into the splined inner cylindrical surface of the clutch drum 2 rotate accordingly. On the other hand, as a hydraulic fluid is transported through the channel 31 formed in the shaft 30 into the hydraulic chamber 9b, hydraulic pressure, thus applied, causes the clutch piston 9 to move toward the hub 3 while overcoming the pressing force applied by the spring 9a. Then, the clutch piston 9 holds the separator plates 4, the carbon discs 5 and the retaining plate 4a between itself and the stopper portion 6 of the clutch drum 2. As a result, the carbon discs 5 come in contact with the rotating separator plates 4 and retaining plate 4a, and thus cause the hub 3 with its splined surface engaged therewith to rotate about the central axis of the clutch drum 2.

(Wet Friction Member and Carbon Fiber Composite Material)

Figure 2A:
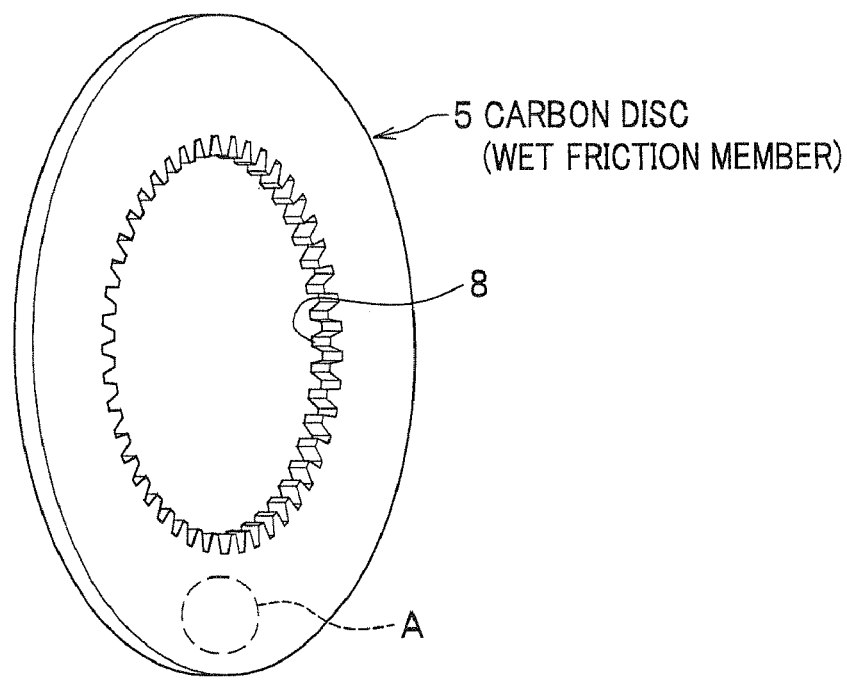
FIG. 2(a) is a perspective view of a wet friction member (carbon disc) according to an exemplary embodiment.

The wet friction member, that is a carbon disc 5, incorporated in the wet multiple disc clutch 1 as described above, according to the present embodiment is manufactured by cutting a carbon fiber composite material as will be described later into a shape as shown in FIG. 2(a), which is annular as described above with internal gear teeth 8 formed on an inner cylindrical surface thereof for fitting into the externally splined hub 3 (see FIG. 1).

Figure 2B:
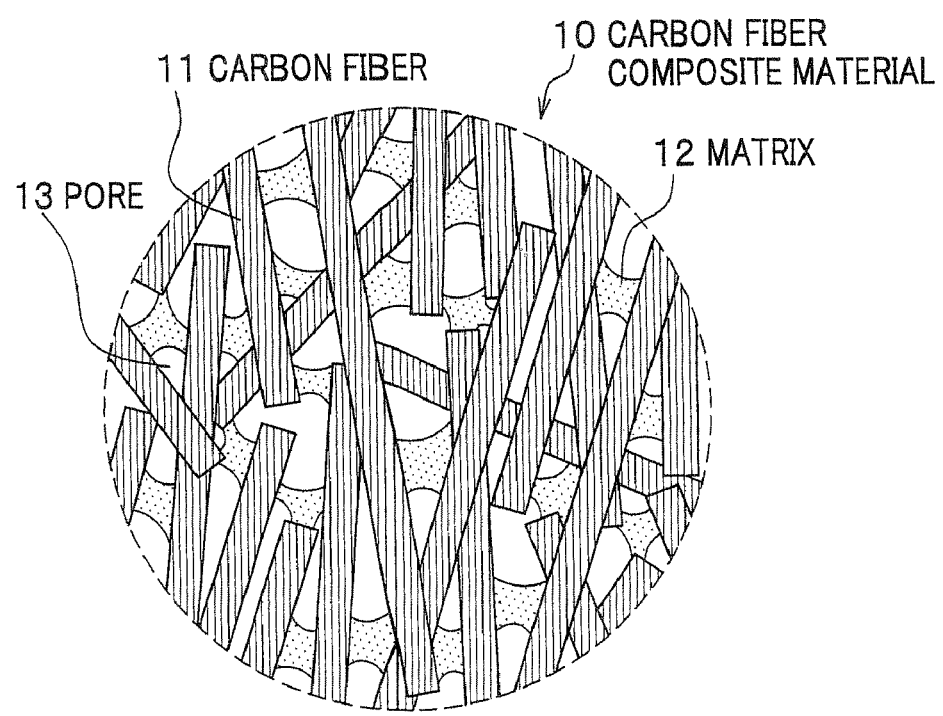
FIG. 2(b) is a diagram schematically showing an enlarged view of portion A of FIG. 2(a) for explaining a composition of a carbon fiber composite material making up the wet friction material (carbon disc).

The carbon fiber composite material 10 used for the carbon disc 5 as illustrated in FIG. 2(b) mainly comprises carbon fibers 11, a matrix 12 binding the carbon fibers 11 together, and pores 13.

The carbon fiber composite material 10 is prepared such that a volume fraction of the carbon fibers 11 exclusive of the pores 13, i.e., a ratio of the volume of the carbon fibers 11 to the sum of the volumes of the carbon fibers 11 and the matrix 12, is not less than 45% and up to 80%, or preferably not less than 55% and up to 80%. It is understood that the up to 80% volume fraction ensures that carbon fibers 11 are securely bound together in their entirety.

The pores 13 are distributed uniformly throughout the entire carbon fiber composite material 10, as shown in FIG. 2(b). A volume fraction of the pores 13 in the carbon fiber composite material (a porosity: ratio of the volumes of the pores 13 to the sum of the volumes of the carbon fibers 11, matrix 12 and pores 13) is adjusted to fall within a range not less than 20% and up to 70%.

The next discussion is directed to an operation and related advantageous effects of the carbon disc 5 obtained from the above-described carbon fiber composite material 10. In the wet multiple disc clutch 1 provided with carbon discs 5 as shown in FIG. 1, the pores 13 (see FIG. 2(b)) in the carbon discs 5 incorporate an ATF (automatic transmission fluid), as is well known. When the carbon discs 5 are pressed against the corresponding rotating separator plates 4 and retaining plate 4a, the separator plates 4 and retaining plate 4a slide on the corresponding carbon discs 5 brought in contact therewith.

On the other hand, each carbon disc 5 (carbon fiber composite material 10 (see FIG. 2(b))) includes a high volume fraction of carbon fibers 11 (exclusive of pores 13, see FIG. 2(b)) that is not less than 45% and up to 80%, or preferably not less than 55% and up to 80%. In other words, the carbon fibers 11 are bound together by a relatively small quantity of matrix 12 (see FIG. 2(b)), smaller than those of the conventional wet friction members (carbon fiber composite materials). As a result, the carbon disc 5 in this embodiment contains more pores 13 which are distributed uniformly than the conventional wet friction members (carbon fiber composite materials). Accordingly, the carbon disc 5 is more excellent in dynamic friction performance than the conventional wet friction members (carbon fiber composite materials). Accordingly, the torques of the separator plates 4 and retaining plate 4a are transmitted more efficiently to the carbon discs 5, so that judder is prevented effectively.

In addition, the carbon disc 5 in this embodiment has a porosity not less than 20% and up to 70%, and thus the dynamic friction performance is improved more securely.

The torques of the separator plates 4 and the retaining plate 4a are transmitted to the carbon discs 5, so that the rotational speeds of the separator plates 4 and the retaining plate 4a are made equal to the rotational speeds of the carbon discs 5. It is to be noted here that the volume fraction of the carbon fibers 11 (exclusive of the pores 13) in each carbon disc 5 is not less than 45%, i.e., the volume fraction of the carbon fibers is higher than those of the conventional wet friction members. As a result, the carbon disc 5 in this embodiment is more excellent in static friction performance than the conventional wet friction members. Accordingly, even when a relatively high torque is transmitted from the separator plates 4 and the retaining plate 4a and applied to the carbon discs 5, the carbon discs 5 are prevented from sliding and retained securely relative to the separator plates 4 and the retaining plate 4a.

(Process for Manufacturing a Carbon Fiber Composite Material)

The carbon fiber composite material 10 according to the present embodiment is manufactured by following the process which comprises a wet preparation step, a forming step and a baking step.

Figure 3A:
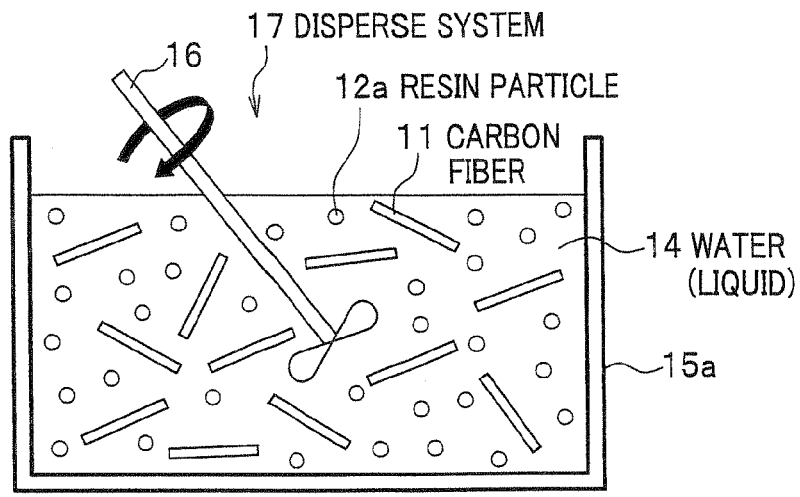
FIG. 3(a), FIG. 3(b), FIG. 3(c) and FIG. 3(d) show process steps of a flow of a process for manufacturing a carbon fiber composite material according to an exemplary embodiment.

In the wet preparation step, as shown in FIG. 3(a), carbon fibers 11 as described above, resin particles 12a and water 14, plus additives on an as-needed basis, are charged into a predetermined container 15a. Water 14 corresponds to "liquid" as set forth in the appended claims. Subsequently, the carbon fibers 11 and the resin particles 12a are dispersed in the water 14 by means of an agitator 16.

Among materials used for the carbon fibers 11 are, for example, pitch-based carbon fibers, polyacrylonitrile-based carbon fibers, rayon-based carbon fibers, and the like. It is to be understood that no particular limitation is put on fiber lengths and fiber diameters of the carbon fibers applicable. Among usable resins are, for example, a phenolic resin, a furan resin, a polyimide resin, an epoxy resin, and other thermosetting resins. Particle sizes of the resins to be used may be generally in the range of 0.3 μm to 300 μm.

Among materials used for the additives are, for example, a particle collector for use in papermaking or water treatment, which includes, to be more specific, a polymer flocculent such as polyacrylamide, polyethylene oxide, etc., an inorganic flocculant such as aluminum sulfate, polyaluminum chloride, etc., and a mixture of such a polymer flocculant and such an inorganic flocculant.

The composition proportions of the carbon fibers 11 and the resin particles may be determined as appropriate in accordance with the volume fraction as described above of the carbon fibers 11 in the carbon fiber composite material 10 to be manufactured.

Figure 3B:
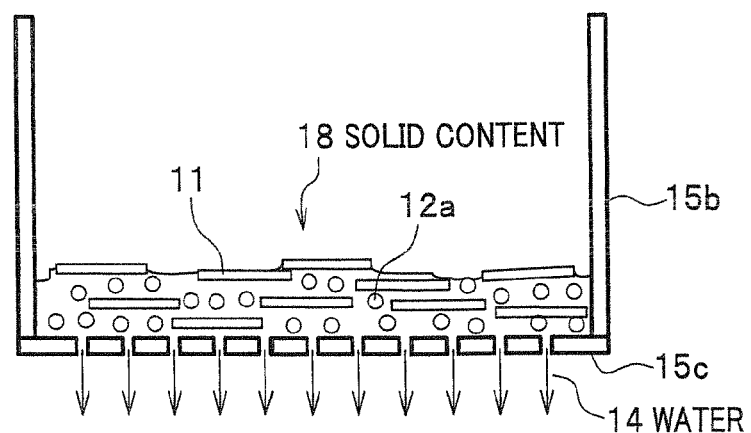

Next, in this wet preparation step, a disperse system 17 (see FIG. 3(a)) in which the carbon fibers 11 and the resin particles 12a are dispersed in water is poured into a container 15b provided with a mesh screen 15c located in a bottom thereof, as shown in FIG. 3(b). As a result, the water 14 in the disperse system 17 (see FIG. 3(a)) is removed through the mesh screen 15c, and a solid content 18 containing wet carbon fibers 11 and resin particles 12a is formed on the mesh screen 15c. The solid content 18 is then let dry. In this wet preparation step, optionally, the disperse system 17 may be agitated by means of the agitator 16 (see FIG. 3(a)) while the water 14 is being removed after the disperse system 17 is poured into the container 15b.

Figure 3C:
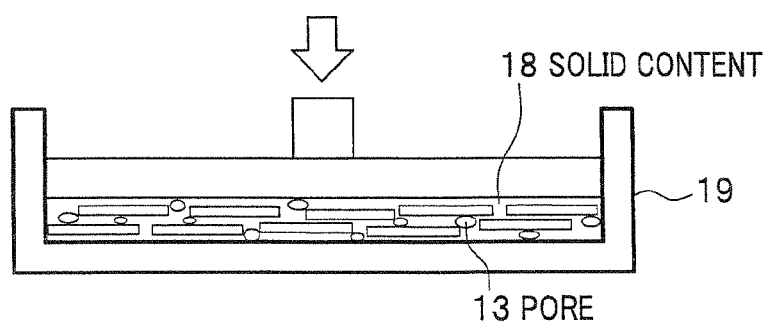

Subsequently, in the forming step, the solid content 18 is pressurized and heated by a hot-press 19, as shown in FIG. 3(c). Through this forming step, the solid content 18 is formed into a shape, in which the solid content 18 is subjected to a subsequent process in the baking step, i.e., like a sheet. In this forming step, the solid content 18 may preferably be pressurized under a pressure in the 10 MPa-to-20 MPa range, and heated at a temperature of 180° C. or so.

Figure 3D:
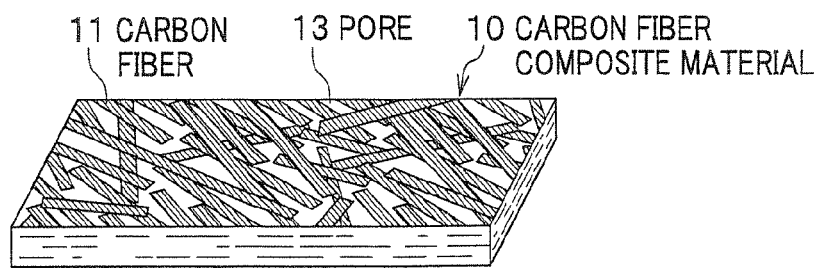

Next, in the baking step, the resulting solid content 18 is baked to thereby form a sheetlike carbon fiber composite material 10 as shown in FIG. 3(d). The baking temperature for the solid content 18 may preferably be in the range of 300° C. to 800° C., and the baking time therefor may be in the range of 30 minutes to 2 hours or so. The baking step may be carried out in the air, or preferably in a nonoxidative atmosphere of argon, nitrogen gas, etc.

The carbon disc 5 to be used as a wet friction member according to the present embodiment is manufactured by cutting the resulting carbon fiber composite material 10 obtained as described above into a shape as shown in FIG. 2.

In the above-discussed process for manufacturing a carbon fiber composite material 10, the wet preparation step causes the carbon fibers 11 and the resin particles 12a to be blended uniformly in the water. Thus, a solid content 18 in which the resin particles 12a are adhered uniformly to the carbon fibers 11 is obtained. In this process step, cohesion of the water 14 serves to inhibit the carbon fibers 11 from swelling their bulk. In other words, the manufacturing process consistent with the present invention may allow more carbon fibers 11 to be incorporated in the carbon fiber composite material 10 in comparison with the conventional dry process of manufacture. In these conditions, the resin particles 12a are retained in the watery interstices between the carbon fibers 11.

In the above-discussed process for manufacturing a carbon fiber composite material 10, the forming step allows the carbon fibers 11 contained in the solid content 18 to be bound together with the resin as described above. The resin in the solid content 18 formed as described above is carbonized through the baking step, and thus becomes a matrix 12 binding the carbon fibers 11 together (see FIG. 2(b)).

Accordingly, the process consistent with the present invention for manufacturing a carbon fiber composite material 10 allows the resin (resin particles 12a), which will form the matrix 12, to be adhered uniformly to the carbon fibers 11, so that the carbon fibers 11 are bound together efficiently with a minimum amount of the resin used therefor. As a result, this manufacturing process can increase the volume fraction of the carbon fibers 11 (exclusive of the pores 13) in the carbon fiber composite material 10.

Furthermore, in this process for manufacturing a carbon fiber composite material 10, the carbon fibers 11 are bound together by the matrix 12 dispersed uniformly within the carbon fiber composite material 10, and thus-formed pores 13 are distributed uniformly throughout the carbon fiber composite material 10. Consequently, according to the proposed process for manufacturing a carbon fiber composite material 10, the carbon fiber composite material 10 suitable for producing the carbon disc 5 (wet friction member) that achieves excellence in both of the static friction performance and the dynamic friction performance as described above can be manufactured.

Although some embodiments of the present invention have been described above, the present invention is not limited to the above-described embodiments. For example, the above embodiments demonstrate an example in which the carbon fiber composite material 10 is applied to a wet multiple disc clutch 1 for an automatic transmission; however, the carbon fiber composite material 10 may be employed for a transfer clutch or brake for a four-wheel drive vehicle, for example.

The above embodiments demonstrate an example in which the carbon disc 5 is manufactured by cutting the carbon fiber composite material 10, but the present invention is not limited thereto; for example, it is conceivable that a disc plate (wet friction member) may be made by joining the carbon fiber composite material 10 to a metal core as a substrate.

The above embodiments demonstrate an exemplary process for manufacturing a carbon fiber composite material 10, in which water 14 is used as a liquid, but the present invention is not limited thereto; any liquid other than water 14 may be used in which the resin particles 12a do not resolve.

The above embodiments demonstrate an example in which the solid content 18 is let dry before being pressurized and heated in the forming step; however, the forming step may be carried out by pressurizing and heating a wet solid content 18.

For implementing the process for manufacturing a carbon fiber composite material 10 according to the present invention, the resin particles 12a dispersed in a liquid may be resin powder, or a resin emulsion or dispersion.

EXAMPLES IMPLEMENTED

The following description is directed to examples implemented to measure the advantageous effects of the carbon fiber composite materials consistent with the present invention.

Example 1

Manufacturing of Carbon Fiber Composite Material

Polyacrylonitrile-based carbon fibers (filaments) and resole phenolic resin (average particle size: 24 µm) powder were dispersed in water, and nonionic polyethylene oxide as a particle collector (polymer flocculent) was added thereto. Herein, the respective composition proportions of the carbon fibers and the resin to the total amount were: carbon fibers=50 mass %; and resin=50 mass %.

Next, the resulting disperse system was poured into a container 15b as shown in FIG. 3(b), so as to remove the water from the disperse system. In the bottom of the container 15b, a solid content containing the carbon fibers and the resin powder was obtained.

Next, the solid content that had been let dry was formed with a pressure of 20 MPa and a heat at 180° C. applied by a hot press. The formed solid content was then baked at 400° C. in an atmosphere of argon for two hours, and a carbon fiber composite material was manufactured. The volume fraction of the carbon fibers (exclusive of pores) in thus-manufactured carbon fiber composite material measured 45%. The porosity of the carbon fiber composite material measured 40%.

<Friction Performance Evaluations of Carbon Fiber Composite Materials>

The manufactured carbon fiber composite material was cut to make a carbon disc 5 having a shape as shown in FIG. 2, and the carbon disc 5 was subjected to friction performance evaluations.

Figure 4:
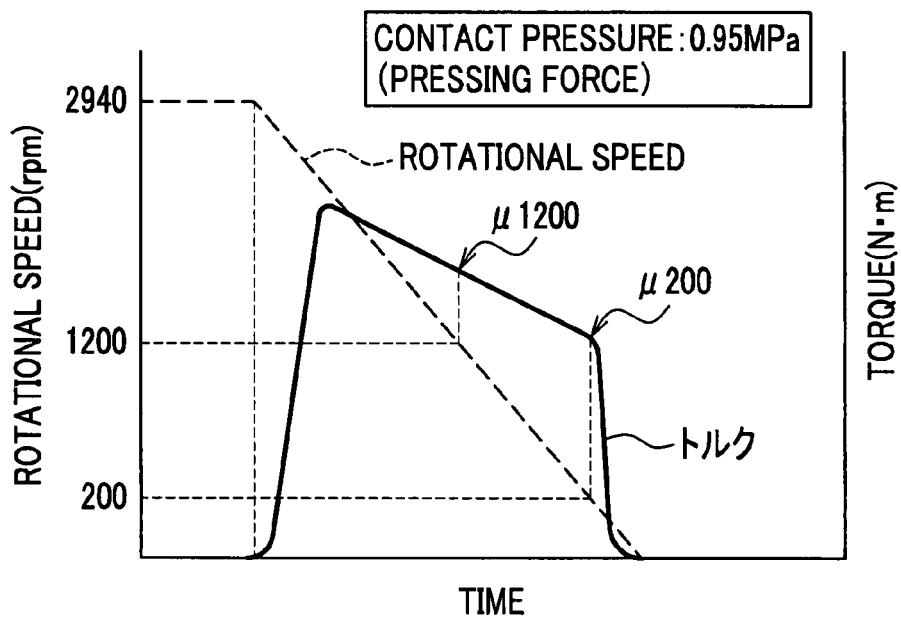
[FIG. 4] Shown herein is a torque waveform represented in a tester used for friction performance evaluations of wet friction members (carbon discs) fabricated in examples implemented.

For the friction performance evaluations, SAE No. 2 tester was employed. FIG. 4 shows a torque waveform in this tester. In the friction performance evaluations, the carbon disc 5 was held between two separator plates similar to the separator plates 4 shown in FIG. 1, and put in the SAE No. 2 tester. The friction performance evaluations were performed, to measure the coefficient of friction µ200 and µ1200, under the conditions where contact pressure: 0.95 MPa; rotational speed: 2940 rpm; inertia: 0.12 kgm$^2$; test fluid temperature: 100° C.; and test cycles: 500 cycles. The µ200 and µ1200 are shown in the waveform in the SAE No. 2 tester of FIG. 4, where µ1200 is a coefficient of friction at the rotational speed of 1200 rpm, and µ200 is a coefficient of friction at the rotational speed of 200 rpm which measured immediately before the torque was abruptly decreased. Here, µ is a value obtained by dividing the torque by the contact pressure at the time of engagement of the clutch. These coefficients of friction were measured by braking test in which a rotating mass was stopped. The ratio of µ200 to µ1200 (hereinafter referred to simply as "µ ratio") obtained from the measured values of µ200 and µ1200 was 1.04.

Also in this friction performance evaluations, µS (static friction coefficient) of the carbon disc 5 was measured by means of the SAE No. 2 tester (contact pressure: 0.95 MPa; rotational speed: 0.7 rpm; and test fluid temperature: 100° C.). The µS of the carbon disc 5 was 0.101. The results are shown in Table 1.

Example 2-Example 4

In Examples 2-4, carbon fiber composite materials were manufactured under the same conditions as in Example 1 except for the respective composition proportions of the carbon fibers and the resin to the total amount of the carbon fibers and the resin, which were adjusted as shown in Table 1. The volume fractions of the carbon fibers (exclusive of the pores) in the respective carbon fiber composite materials manufactured, and the porosities thereof are shown in Table 1. The manufactured carbon fiber composite materials were cut to thereby make the carbon discs 5 each having the shape as shown in FIG. 2. The friction performance evaluations of the carbon discs were performed in the same manner as in Example 1. The results of evaluations of the friction performances ($\mu$ ratio and $\mu$S) are shown in Table 1.

TABLE 1

|  |  | Example 1 | Example 2 | Example 3 | Example 4 |
|---|---|---|---|---|---|
| Material Composition (Mass %) | Carbon Fibers | 50 | 60 | 70 | 80 |
|  | Phenolic Resin | 50 | 40 | 30 | 20 |
| Volume Fraction of Carbon Fibers exclusive of Pores (Vol. %) |  | 45 | 55 | 63 | 73 |
| Porosity (Vol. %) |  | 40 | 40 | 40 | 40 |
| Friction Performance | $\mu$ ratio | 1.04 | 0.985 | 0.974 | 0.958 |
|  | $\mu$S | 0.101 | 0.105 | 0.110 | 0.110 |

Example 5-Example 8

In Examples 5-8, carbon fiber composite materials were manufactured under the same conditions as in Example 1 except for the respective composition proportions of the carbon fibers and the resin to the total amount of the carbon fibers and the resin, which were adjusted as shown in Table 2. The volume fractions of the carbon fibers (exclusive of the pores) in the respective carbon fiber composite materials manufactured, and the porosities thereof are shown in Table 2. The manufactured carbon fiber composite materials were cut to thereby make the carbon discs 5 each having the shape as shown in FIG. 2. The friction performance evaluations of the carbon discs were performed in the same manner as in Example 1. The results of evaluations of the friction performances ($\mu$ ratio and $\mu$S) are shown in Table 2.

TABLE 2

|  |  | Example 5 | Example 6 | Example 7 | Example 8 |
|---|---|---|---|---|---|
| Material Composition (Mass %) | Carbon Fibers | 50 | 60 | 60 | 60 |
|  | Phenolic Resin | 50 | 40 | 40 | 40 |
| Volume Fraction of Carbon Fibers exclusive of Pores (Vol. %) |  | 50 | 52 | 54 | 60 |
| Porosity (Vol. %) |  | 10 | 30 | 50 | 55 |
| Friction Performance | $\mu$ ratio | 1.26 | 1.014 | 0.957 | 0.934 |
|  | $\mu$S | 0.106 | 0.103 | 0.106 | 0.101 |

<Evaluations of Dynamic Friction Performance and Static Friction Performance>

Figure 5:
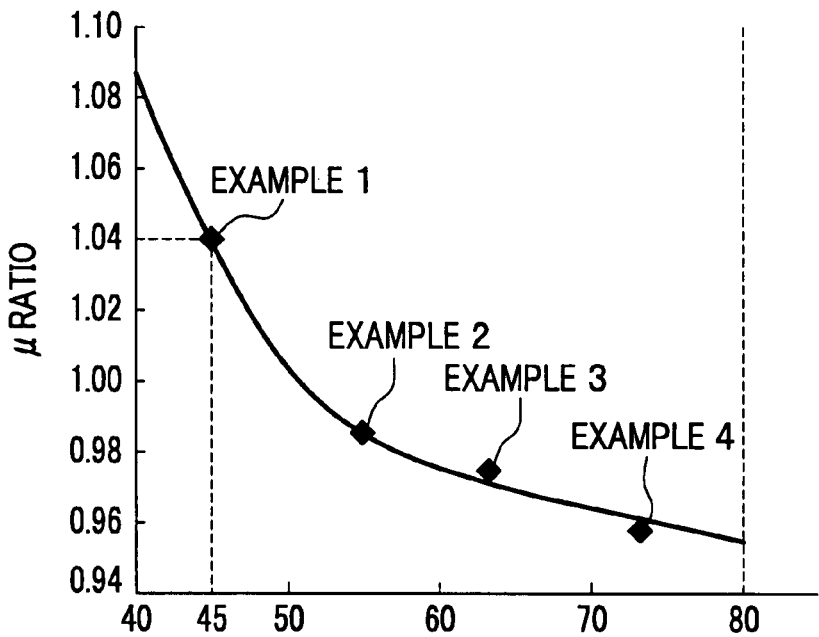
[FIG. 5] Shown herein is a graph representing a relationship between a volume fraction and a μ ratio of carbon fibers in the wet friction members (carbon discs) fabricated in the examples implemented.
Figure 6:
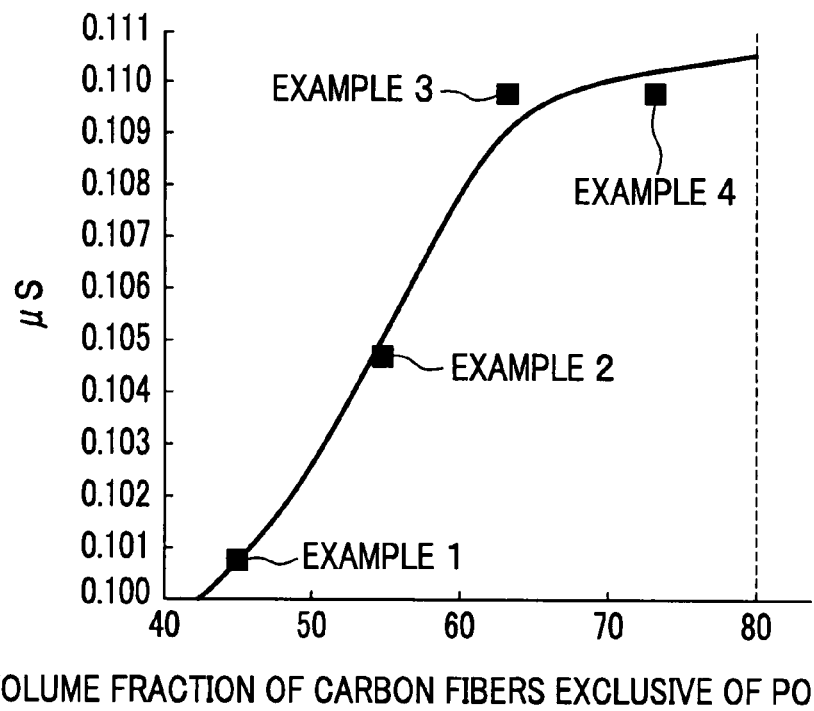
[FIG. 6] Shown herein is a graph representing a relationship between a volume fraction and a μS of carbon fibers in the wet friction members (carbon discs) fabricated in the examples implemented.
Figure 7:
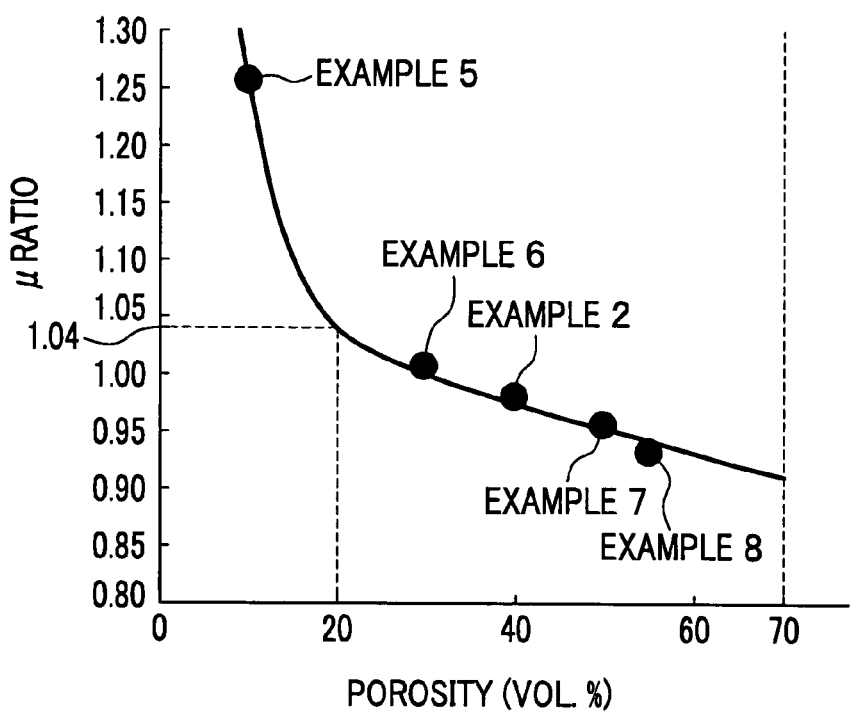
[FIG. 7] Shown herein is a graph representing a relationship between a porosity and a μ ratio of the wet friction members (carbon discs) fabricated in the examples implemented.

FIG. 5 is a graph representing a relationship between volume fractions and $\mu$ ratios of the carbon fibers in the carbon discs 5 manufactured in Examples 1-4. FIG. 6 is a graph representing a relationship between volume fractions and $\mu$S of the carbon fibers in the carbon discs 5 manufactured in Examples 1-4. FIG. 7 is a graph representing a relationship between porosities and $\mu$ ratios of the carbon discs 5 manufactured in Examples 5-8.

As shown in FIG. 5, the $\mu$ ratios, as indices of dynamic friction performance, of the respective carbon discs 5 manufactured in Examples 1-4 were not more than 1.04, which demonstrates excellence in judder preventiveness. When the volume fractions of the carbon fibers (exclusive of pores) were not less than 55%, the $\mu$ ratios were significantly lower, not more than 0.985. As shown in FIG. 6, the $\mu$S of the respective carbon discs 5 manufactured in Examples 1-4 were not less than 0.101. Accordingly, the respective carbon discs 5 manufactured in Examples 1-4 turned out to be excellent in both of dynamic friction performance and static friction performance.

As shown in FIG. 7, when the porosities were higher (increasing oil lubricity), the $\mu$ ratios as indices of dynamic friction performance were lower, and thus the porosities were not less than 20%, and the $\mu$ ratios were not more than 1.04. Accordingly, as apparent from FIGS. 5 and 7, those of which the volume fraction of the carbon fibers is not less than 45% and the porosity is not less than 20% would be most preferable.

The invention claimed is:

1. A disk-shaped wet friction member including a carbon fiber composite material comprising:
   carbon fibers;
   a matrix binding the carbon fibers together; and
   pores,
   wherein a volume fraction of the carbon fibers exclusive of the pores is not less than 45 percent and up to 80 percent.

2. The disk-shaped wet friction member according to claim 1, wherein a porosity of the carbon fiber composite material is not less than 20 percent and up to 70 percent.

3. A wet friction member having a carbon fiber composite material comprising:
   carbon fibers;
   a matrix binding the carbon fibers together; and
   pores,
   wherein a volume fraction of the carbon fibers exclusive of the pores is not less than 45 percent and up to 80 percent; and, wherein the wet friction member is a portion of a brake for a four-wheel drive vehicle.

4. A wet friction member having a carbon fiber composite material comprising:
   carbon fibers;
   a matrix binding the carbon fibers together; and
   pores,
   wherein a volume fraction of the carbon fibers exclusive of the pores is not less than 45 percent and up to 80 percent; and
   wherein the wet friction member is a portion of a wet multiple disc clutch for an automatic transmission.

5. A wet friction member having a carbon fiber composite material comprising:
   carbon fibers;
   a matrix binding the carbon fibers together; and
   pores,
   wherein a volume fraction of the carbon fibers exclusive of the pores is not less than 45 percent and up to 80 percent; and
   wherein the wet friction member is a portion of a transfer clutch for a four-wheel drive vehicle.

6. A disk-shaped wet friction member including a carbon fiber composite material comprising:
   carbon fibers;
   a matrix binding the carbon fibers together; and
   pores,
   wherein a volume fraction of the carbon fibers exclusive of the pores is not less than 55 percent and up to 80 percent.

* * * * *